June 15, 1937.　　　　J. D. SHAW　　　　2,084,224
CABLE JOINT
Filed Feb. 11, 1936
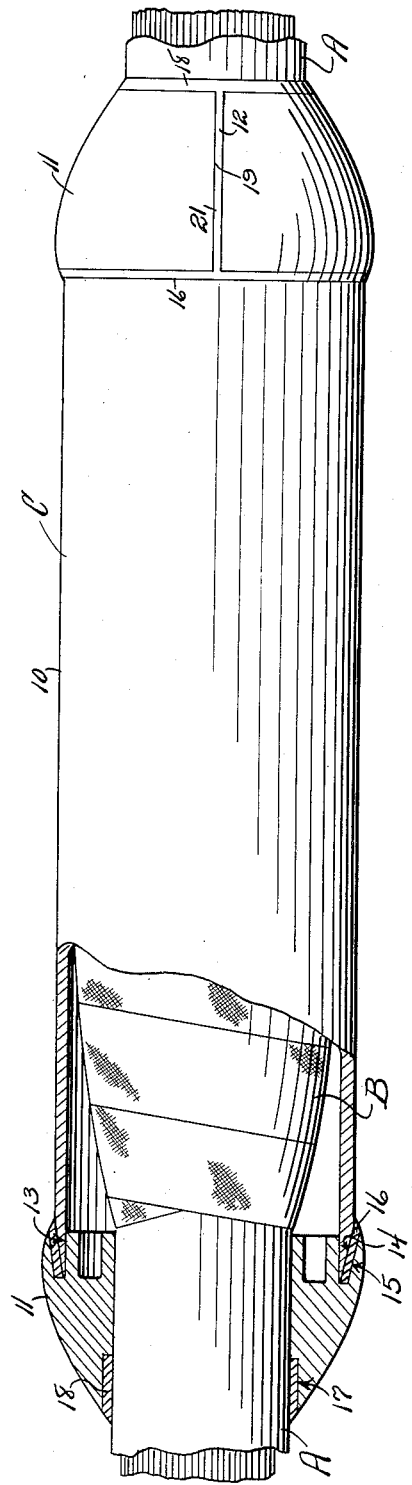
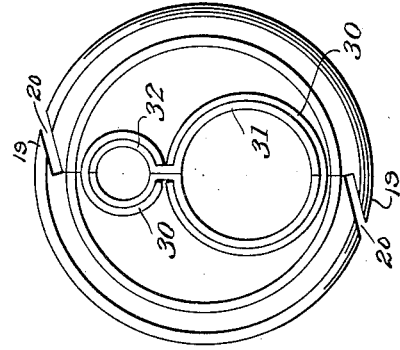
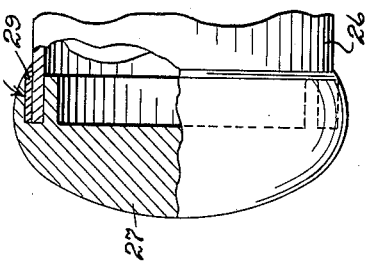
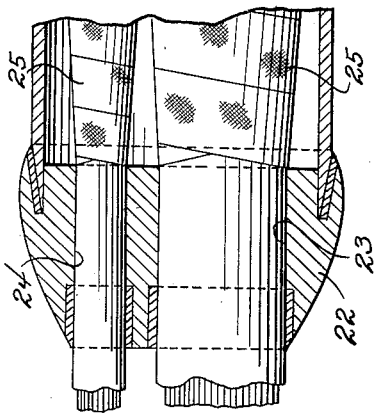
John D. Shaw
INVENTOR
BY Victor J. Evans & Co.
ATTORNEY Patented June 15, 1937

2,084,224

UNITED STATES PATENT OFFICE 2,084,224

CABLE JOINT

John D. Shaw, Washington, D. C.

Application February 11, 1936, Serial No. 63,406

1 Claim. (Cl. 285—114)

The invention relates to a splice joint and more especially to a protector for a spliced cable joint.

The primary object of the invention is the provision of a protector of this character, wherein the splice or joint of electric cables or the terminal of an electric cable can be completely sealed against moisture and also will enable the splicing or the wrapping of the terminal and the protection thereto to be carried forth with dispatch and without requiring lead wiping as is commonly done for the sealing of such terminal or the splicing of the cable as well as the possibility of solder making entry to the joint or terminal.

Another object of the invention is the provision of a protector of this character, wherein the application is permitted either before or after the splicing of the cable with dispatch and a material saving in soldering material is assured and at the same time avoiding the working of the solder into the joint or the terminal of the cable as protected.

A further object of the invention is the provision of a protector of this character, wherein there is produced a fool-proof joint and enables protection to one or several independent electric cables either at the terminal or terminals thereof or at the joinder of the same.

A still further object of the invention is the provision of a protector of this character, wherein uniformity in its shape is assured which is impossible with the solder wiped joint ordinarily created when splicing electric cables or covering the terminal thereof and furthermore the splice, terminal or joint will be completely protected against weather elements or moisture when beneath a ground surface irrespective of high or low voltage types of cables, the protector being for all types of electric cables.

A still further object of the invention is the provision of a protector of this character, wherein hand or mechanical requirements in the splicing of cables together is reduced to a minimum and the possibility of resultant mechanical defects practically eliminated as well as considerable reduction in the soldering process.

A still further object of the invention is the provision of a protector of this character, which is extremely simple in its construction, thoroughly reliable and effective, strong, durable, and inexpensive to manufacture and install.

With these and other objects in view, the invention consists in the features of construction, combination and arrangement of parts as will be hereinafter more fully described, illustrated in the accompanying drawing, which discloses the preferred embodiment of the invention and pointed out in the claim hereunto appended.

In the accompanying drawing:

Figure 1 is a side elevation of a cable splice showing the protector constructed in accordance with the invention applied and partly broken away.

Figure 2 is a fragmentary vertical sectional view through a protector showing a slight modification applied to several electric independent cables.

Figure 3 is a fragmentary side elevation partly in section of a protector modified for a cable terminal.

Figure 4 is an elevation of one of the protector ends looking toward the inner side thereof.

Similar reference characters indicate corresponding parts throughout the several views in the drawing.

Referring to the drawing in detail, particularly Figure 1, A designates generally portions of electric cables, these being of the lead covered type and B a completed wrapped spliced joint therebetween, the splicing being effected in the conventional manner while C is the protector constituting the present invention and hereinafter fully described.

The protector C comprises a tube or pipe 10, this being made of non-corrosive material and similar to the covering for the cables A so as to take solder. The tube or pipe 10 may be longitudinally split or not and when longitudinally split permits its application to a completed spliced joint between cables. When not split prior to the splicing of the cables it is slipped onto one of the cables at the proper distance removed from the splicing point and after the splicing has been completed the tube or pipe is pulled over the joint. Closing the ends of the tube or pipe 10 are end heads or caps 11, preferably split transversely at the center of each as at 12 and in the inner face of each head or cap slightly removed from the outer periphery thereof is an annular groove or channel 13 for accommodating the end of the tube or pipe 10 therein. This end of such tube or pipe 10 is externally beveled at 14 and the confronting wall 15 of said groove or channel 13 is correspondingly beveled and provides a space for the reception of solder 16 sealing the said head or cap 11 on its companion end of the tube or pipe 10 and thus excluding entry of moisture within the latter at the splice or joint B. Each cap or head 11 is centrally open accommodating the cable A and of a size in conformity with the cross sectional size of such cable while the wall of this opening is pocketed at 17, the pocket opening through the outer end of the cap or head receiving solder 18 which seals the said cap or head about the cable, the solder being adapted to adhere to the covering of the cable A. Therefore, the tube or pipe 10 is completely sealed from outside weather elements as seepage cannot occur about the cable A or at the point of connection of the tube or pipe 10 with the caps or heads.

Where each cap or head is transversely split there is formed reverse overlaps 19 and corresponding solder receiving spaces 20, respectively, with respect to the separable sections of said head or cap and the spaces 20 accommodate solder for sealing the joints at the overlaps 19 to exclude moisture entries at these points, the solder in the spaces 20 being indicated at 21.

In Figure 2 of the drawing there is shown a slight modification wherein the end cap or head 22 has the openings 23 and 24, respectively, for several independent cables, the splice joints of such cables being indicated at 25.

In Figure 3 of the drawing there is shown a further modification wherein the tube or pipe 26 similar to the tube or pipe 10 is adapted for accommodating a cable terminal and the outermost end of this tube or pipe 26 wears an imperforate or solid closure cap or head 27, it being sealed to the tube or pipe 26 in a manner similar to the caps or heads 11 excepting that in this instance the pipe 26 is not externally beveled and the walls of the channel or groove 28 are straight, the solder being indicated at 29 within the said channel or groove. With reference to Figure 4 in the drawing where the cap or head is made in two sections it is desirable to use one or several split clamps 30 when applying the two sections in position and this clamp engages with flanges 31 and 32, respectively, which encircle the cables and are formed at the inner sides of the said sections of the cap or head, the said clamp 30 being adapted to remain within the joint after the sections are soldered together in their permanent position.

The splice joint or terminal built is completely protected through the use of the tube or pipe and the heads or caps when sealed upon the latter and in this manner the conventional solder closing and wiping thereof for the splice or terminal of cable or cables will be entirely eliminated. The protection is had with dispatch and with economy in the making of the same.

It is preferable to round the outer surface or face of the head or cap to give a finished or neat appearance thereto, in this instance the said head or cap is outwardly tapered.

In the common type of covering of terminal or splice joint of electric cables to gain access to the splice or terminal it is necessary to junk those parts sealing such splice or terminal which involves a lead sleeve and wiped lead ends because these have to be materially mutilated for the removal thereof from the cable. With the present device hereinbefore described it is not necessary and in fact no part of the protector is junked because the lead tube or pipe 10 can be slipped off after disconnecting the splice and also the caps or ends can be conveniently removed so that these parts can be used indefinitely.

What is claimed is:

A protector for cable joints, comprising a precast cylindrical body fitting a cable at a joint therein and incasing said joint, a precast cap embracing the cable and interfitting with the end of said body, the cap being formed with solder receiving channels internally thereof at opposite ends, and a solder sealing the points of interfitting of the body and cap and the cap on the cable, respectively, and wholly confined in the channels.

JOHN D. SHAW.